US012571122B2

(12) United States Patent
Higai et al.

(10) Patent No.: US 12,571,122 B2
(45) Date of Patent: Mar. 10, 2026

(54) AUTOMOTIVE CRASHWORTHINESS ENERGY ABSORPTION PART, AND METHOD FOR MANUFACTURING AUTOMOTIVE CRASHWORTHINESS ENERGY ABSORPTION PART

(71) Applicant: JFE STEEL CORPORATION, Tokyo (JP)

(72) Inventors: Kazuhiko Higai, Tokyo (JP); Tsuyoshi Shiozaki, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 475 days.

(21) Appl. No.: 18/012,719

(22) PCT Filed: May 10, 2021

(86) PCT No.: PCT/JP2021/017682
§ 371 (c)(1),
(2) Date: Dec. 23, 2022

(87) PCT Pub. No.: WO2022/038842
PCT Pub. Date: Feb. 24, 2022

(65) Prior Publication Data
US 2023/0257899 A1 Aug. 17, 2023

(30) Foreign Application Priority Data
Aug. 18, 2020 (JP) ................................. 2020-137778

(51) Int. Cl.
*C25D 13/14* (2006.01)
*B62D 21/15* (2006.01)

(52) U.S. Cl.
CPC ............ *C25D 13/14* (2013.01); *B62D 21/152* (2013.01)

(58) Field of Classification Search
CPC . C08L 63/00; B32B 7/12; B32B 27/38; B32B 5/18; B60R 13/00; B60R 13/08; B62D 21/15; B62D 29/00; B62D 29/002
See application file for complete search history.

(56) References Cited

U.S. PATENT DOCUMENTS

| 2010/0028651 A1 | 2/2010 | Golden et al. |
| 2011/0236616 A1 | 9/2011 | Belpaire |
(Continued)

FOREIGN PATENT DOCUMENTS

| CN | 102177013 A | 9/2011 |
| CN | 102834641 A | 12/2012 |
(Continued)

OTHER PUBLICATIONS

JP-2021084564-A English translation (Year: 2021).*
(Continued)

*Primary Examiner* — Alicia J Weydemeyer
*Assistant Examiner* — Laura B Figg
(74) *Attorney, Agent, or Firm* — OLIFF PLC

(57) ABSTRACT

An automotive crashworthiness energy absorption part includes a tubular member formed by using a hat-shaped section part including a top portion and a side-wall portion; a coating part made of a material having a lower strength than the tubular member, the coating part being arranged on outer surfaces of the top portion and the side-wall portion at a portion including a corner portion configured to connect the top portion and the side-wall portion, with a gap of 0.2 mm or more and 3 mm or less from the outer surface of the top portion, the outer surface of the side-wall portion, and an outer surface of the corner portion; and a coating film of an electrodeposition paint formed in the gap.

2 Claims, 8 Drawing Sheets

(56)          References Cited

U.S. PATENT DOCUMENTS

| | | |
|---|---|---|
| 2016/0114747 A1 | 4/2016 | Ishitobi et al. |
| 2018/0251158 A1 | 9/2018 | Narahara et al. |
| 2022/0081033 A1 | 3/2022 | Higai et al. |
| 2022/0219631 A1 | 7/2022 | Higai et al. |

FOREIGN PATENT DOCUMENTS

| | | |
|---|---|---|
| CN | 105539332 A | 5/2016 |
| JP | 2000-318075 A | 11/2000 |
| JP | 2002-337748 A | 11/2002 |
| JP | 2005-271875 A | 10/2005 |
| JP | 2006-240134 A | 9/2006 |
| JP | 2008-162427 A | 7/2008 |
| JP | 2010-064669 A | 3/2010 |
| JP | 2017-61068 A | 3/2017 |
| JP | 2017-136973 A | 8/2017 |
| JP | 2018-144529 A | 9/2018 |
| JP | 2020-100183 A | 7/2020 |
| JP | 6729762 B1 | 7/2020 |
| JP | 2021084564 A * | 6/2021 |
| KR | 10-2004-0104765 A | 12/2004 |

OTHER PUBLICATIONS

May 30, 2024 Office Action issued in Chinese Patent Application No. 202180046335.5.

Jan. 8, 2024 Extended Search Report issued in European Patent Application No. 21857994.4.

Jul. 20, 2021 International Search Report issued in International Patent Application No. PCT/JP2021/017682.

Aug. 27, 2024 Office Action issued in Korean Patent Application No. 10-2023-7005056.

Nov. 25, 2024 Office Action issued in Chinese Patent Application No. 202180046335.5.

Wang, Production and Application of Epoxy Resin, 2nd edition, Chemical Industry Press, pp. 526-530, 2001.

Xie et al., Collection of Latest Coating Variety Formulations and Processes, 1st editon, China Industry Press, pp. 87-89, 1996.

* cited by examiner

TENSILE STRENGTH TS OF STEEL SHEET [MPa]

(a)                     (b)

(a)                                                                                    (b)

(a)          (b)

(a)                                    (b)

(c)                                    (d)

AUTOMOTIVE CRASHWORTHINESS ENERGY ABSORPTION PART, AND METHOD FOR MANUFACTURING AUTOMOTIVE CRASHWORTHINESS ENERGY ABSORPTION PART

FIELD

The present invention relates to an automotive crashworthiness energy absorption part and a method for manufacturing the automotive crashworthiness energy absorption part, and more particularly to an automotive crashworthiness energy absorption part that is axially crushed when a crashworthiness load is input from a front side or a rear side of an automotive body to absorb crashworthiness energy, and a method for manufacturing the automotive crashworthiness energy absorption part.

BACKGROUND

As techniques for improving crashworthiness energy absorptive properties of automobiles, there exist many techniques such as optimization of a shape, a structure, a material, and the like of automotive parts. Moreover, in recent years, many techniques have been proposed to achieve both improvement of crashworthiness energy absorptive properties of automotive parts and weight reduction of automotive bodies, by causing resin to foam and filling the inside of automotive parts having a closed cross section shape.

For example, Patent Literature 1 discloses a technique in which, in an automotive structural member having a structure in which a closed space is formed inside by aligning the direction of top portions of hat-shaped cross section parts such as a side sill, a floor member, a pillar, and overlapping flange portions, bending strength and torsional stiffness of the automotive structural member are improved while suppressing an increase in weight by filling the inside with a foam filler, and stiffness and collision safety of the automotive body are improved.

In addition, Patent Literature 2 discloses a technique in which, when an inner space of a closed cross section shape such as a pillar in which hat-shaped cross section parts face each other and flange portions are combined is filled with a high stiffness foam body, the high stiffness foam body is fixed by compressive counterforce due to filling and foaming of the high stiffness foam body to improve vibration damping performance that suppresses transmission of vibration sound, and improve strength, stiffness, and crashworthiness energy absorptive properties.

Patent Literature 3 discloses a metal-carbon fiber reinforced plastic (CFRP) composite material in which a reinforcement material formed of CFRP in which a plurality of fiber layers are laminated is adhered to a surface of a metal member with a thermosetting adhesive. The metal-CFRP composite material has a structure that includes a residual shear stress relaxing portion with a thickness gradually decreasing from a main body portion of the reinforcement material toward an outer edge so as to relax the residual shear stress generated in the thermosetting adhesive due to a difference in a coefficient of linear thermal expansion between the metal member and the reinforcement material after adhesion.

Moreover, Patent Literature 4 discloses an automotive part that includes a front side member including: an energy absorption portion formed of fiber reinforced plastic (FRP) having a tubular-shaped cross section that causes sequential axial crush from an input end side by an input load in an axial direction; and a support portion continuously formed with the energy absorption portion and formed of FRP, and joined to automotive parts. The energy absorption portion has reinforcement fibers equally oriented in a longitudinal direction of the front side member and a direction perpendicular to the longitudinal direction, the support portion has reinforcement fibers oriented with isotropy, and the automotive part can be integrally molded.

CITATION LIST

Patent Literature

Patent Literature 1: JP 2006-240134 A
Patent Literature 2: JP 2000-318075 A
Patent Literature 3: JP 2017-61068 A
Patent Literature 4: JP 2005-271875 A

SUMMARY

Technical Problem

According to the techniques disclosed in Patent Literatures 1 and 2, it is stated that, by filling the inside of an automotive part with a foam filler or a foam body, it is possible to improve strength against bending deformation, crashworthiness energy absorptive properties, and stiffness against torsional deformation, of the automotive part, and to suppress deformation of the automotive part.

However, for automotive parts such as a front side member and a crash box that absorb crashworthiness energy by buckling deformation in a bellows shape when a crashworthiness load is input from the front side or the rear side of an automobile and causes axial crushing, even when the technique of filling the inside of the automotive part with a foam filler or a foam body is applied, since the foam filler or the foam body is simply filled inside the automotive part, adhesion force between the automotive part and the foam filler or the foaming agent is insufficient. As a result, there has been a problem that the foam filler or foaming agent inside the part blows out through a gap or the like formed in a joining portion of the part at the time of collision, making it difficult to improve crashworthiness energy absorptive properties. In addition, there has also been a problem that an additional process of filling with foam resin without forming any gap is required, and production cost in manufacturing automotive parts increases.

In addition, according to the techniques disclosed in Patent Literatures 3 and 4, it is stated that bending strength can be improved by adhering CFRP to the surface of a metal, and a reduction in part assembly man-hours and a reduction in weight increase due to a reduction in the number of fastening parts can be achieved by integrally manufacturing parts in consideration of orientation of CFRP itself.

However, even when CFRP is applied to an axial crush part that involves deformation, CFRP has high strength, but significantly low elongation. Therefore, there has been a problem that break and fracture of CFRP occur as soon as bellows-shaped deformation starts, and crashworthiness energy absorptive properties are not improved. In addition, there has also been a problem that CFRP has a significantly high cost.

The present invention has been made to solve the above problems, and an object of the present invention is to provide: an automotive crashworthiness energy absorption part such as a front side member and a crash box that, when a crashworthiness load is input from the front side or the rear side of an automotive body and causes axial crushing, improves crashworthiness energy absorbing effect by forming a thick coating film of coating on an outer surface, can function as a vibration-damping material that absorbs vibration generated in the automotive body, and can reduce additional production processes, thus preventing a large increase in the production cost; and a method for manufacturing the automotive crashworthiness energy absorption part.

Solution to Problem

The inventors have intensively studied a method for solving the above problems, and have found that it is possible to improve the crashworthiness energy absorbing effect without requiring an additional process of filling with a filler such as foam resin without forming any gap by utilizing an electrodeposition paint, which is generally used in a coating process in automobile manufacturing. The present invention has been made on the basis of such findings, and specifically includes the following configurations.

An automotive crashworthiness energy absorption part according to the present invention is provided in a front portion or a rear portion of an automotive body, the automotive crashworthiness energy absorption part being axially crushed when a crashworthiness load is input from a front side or a rear side of the automotive body to absorb crashworthiness energy, and includes: a tubular member formed by using a hat-shaped section part including a top portion and a side-wall portion; a coating part made of a material having a lower strength than the tubular member, the coating part being arranged on outer surfaces of the top portion and the side-wall portion at a portion including a corner portion configured to connect the top portion and the side-wall portion, with a gap of 0.2 mm or more and 3 mm or less from the outer surface of the top portion, the outer surface of the side-wall portion, and an outer surface of the corner portion; and a coating film of an electrodeposition paint formed in the gap.

A method for manufacturing an automotive crashworthiness energy absorption part according to the present invention provided in a front portion or a rear portion of an automotive body, the automotive crashworthiness energy absorption part being axially crushed when a crashworthiness load is input from a front side or a rear side of the automotive body to absorb crashworthiness energy, includes: a part manufacturing step of manufacturing a pre-coated part including: a tubular member formed by using a hat-shaped section part including a top portion and a side-wall portion; and a coating part made of a material having a lower strength than the tubular member, the coating part being arranged on an outer surface of the tubular member at a portion including a corner portion configured to connect the top portion and the side-wall portion, with a gap of 0.2 mm or more and 3 mm or less from an outer surface of the top portion, an outer surface of the side-wall portion, and an outer surface of the corner portion; and a coating step of forming a coating layer on a surface of the pre-coated part including the gap by an electrodeposition coating process by electrodeposition coating in a state where the pre-coated part is attached to the automotive body, and forming a coating film by thermosetting the coating layer by paint baking treatment subsequent to the electrodeposition coating process.

Advantageous Effects of Invention

According to the present invention, in the course of compressive deformation of the tubular member that absorbs crashworthiness energy by axial crushing when a crashworthiness load is input from the front side or the rear side of the automotive body, buckling strength of the tubular member is improved, and buckling deformation in a bellows-shaped can be caused without reducing deformation resistance of the tubular member, further, fracture of the bending portion in the buckling deformation of the tubular member can be prevented, and absorptive properties of crashworthiness energy can be significantly improved. In addition, vibration from the automotive engine and vibration input to the automotive body from various directions during driving an automobile are absorbed, and vibration-damping properties can be improved. Moreover, the coating part is included in the present invention. Therefore, it is possible to form a coating film having a target thickness in electrodeposition coating, which is generally performed in the coating process in automobile manufacturing, and to manufacture the coating film using a conventional automobile manufacturing line as it is.

DESCRIPTION OF EMBODIMENTS

First Embodiment

Figure 1:
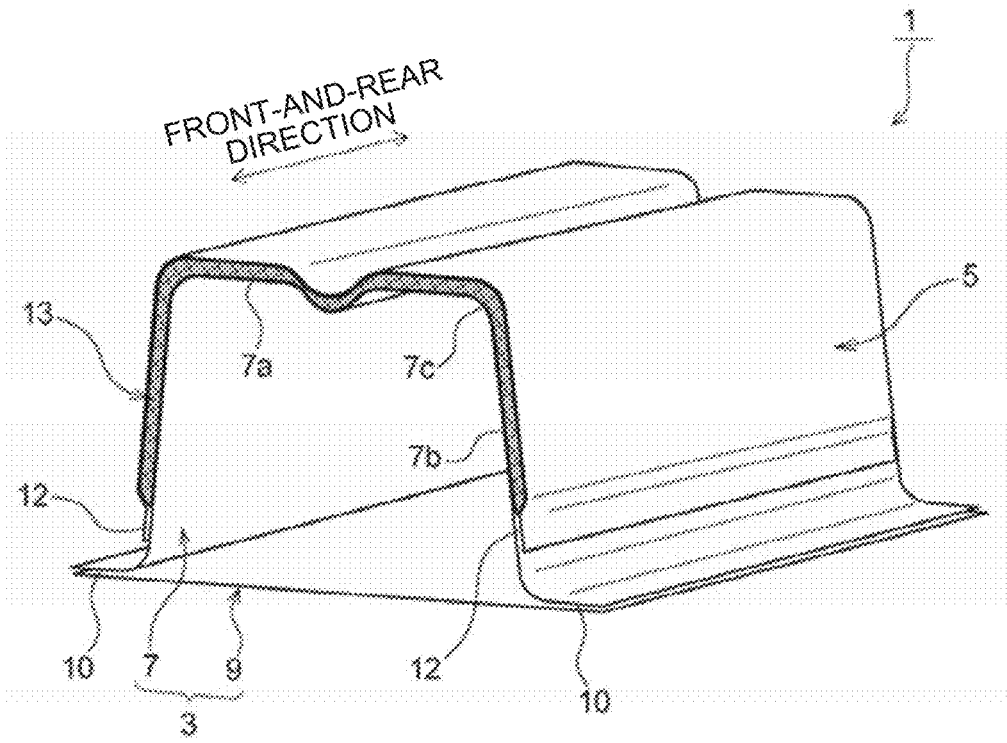
FIG. 1 is a perspective view illustrating an automotive crashworthiness energy absorption part according to a first embodiment of the present invention.

An automotive crashworthiness energy absorption part according to the present embodiment will be described below. Note that, in the present specification and the drawings, elements having substantially the same function and configuration are denoted by the same reference numerals, and redundant description is omitted.

Figure 2:
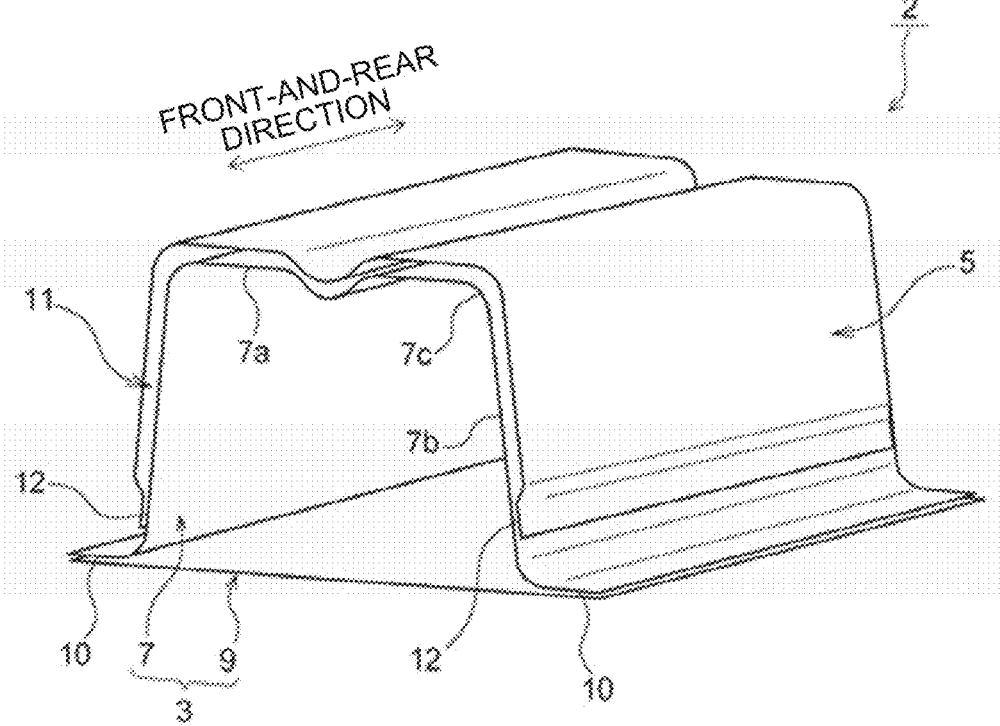
FIG. 2 is a perspective view illustrating a state before a coating film is formed on the automotive crashworthiness energy absorption part according to the first embodiment of the present invention.

An automotive crashworthiness energy absorption part 1 (FIG. 1) according to the present embodiment is provided in a front portion or a rear portion of an automotive body, and is axially crushed when a crashworthiness load is input from a front side or a rear side of the automotive body to absorb crashworthiness energy. In a state where the automotive crashworthiness energy absorption part 1 is attached to the automotive body, a coating layer of electrodeposition paint is formed on a surface thereof, and the coating layer is cured by paint baking treatment to form a coating film. As illustrated in FIG. 1, a coating part 5 is provided on an outer surface side of a tubular member 3 formed using a hat-shaped section part, and a coating film 13 of an electrodeposition paint is formed in a gap between the hat-shaped section part and the coating part 5. FIG. 2 illustrates a state of the automotive crashworthiness energy absorption part 1 before electrodeposition coating (hereinafter, referred to as a pre-coated part 2). Each member will be described below with reference to FIGS. 1 and 2.

<Tubular Member>

The tubular member 3 is formed of a metal sheet such as a steel sheet, and is formed in a tubular shape by joining an outer part 7 having a hat-shaped cross section shape (hat-shaped section part in the present invention) including a top portion 7a, side-wall portions 7b, and corner portions 7c that connect the top portion 7a and the side-wall portions 7b with an inner part 9 having a flat sheet shape at joining portions 10 that are flange portions of the outer part 7. In a course of a crashworthiness load being input to a tip end of the automotive crashworthiness energy absorption part 1 in the axial direction and the tubular member 3 being axially crushed when the crashworthiness load exceeds the buckling strength, the automotive crashworthiness energy absorption part 1 including such a tubular member 3 absorbs crashworthiness energy by repeatedly causing buckling deformation in a bellows shape in the tubular member 3.

<Coating Part>

The coating part 5 is formed of a metal sheet such as a steel sheet, disposed on an outer surface side of the outer part 7 at a portion including the corner portions 7c so as to form a gap 11 of 0.2 mm or more and 3 mm or less, and is joined by spot welding or the like at joining portions 12 (see FIG. 2). The coating part 5 may be provided over the entire length of the outer part 7 in the axial direction, but may be provided only over a range in which the automotive crashworthiness energy absorption part 1 is desired to be deformed in a bellows shape. For example, in a case where the automotive crashworthiness energy absorption part 1 is installed on the front portion of an automotive body and desired to be deformed in a bellows shape in a range from the front end to a middle portion in the axial direction, the coating part 5 is sufficient to be provided in this range of the outer part 7. In addition, a portion of the outer part 7 where the coating part 5 is not provided, for example, a range from the middle portion to the rear end in the axial direction is sufficient to be formed, for example, in a bead-shape extending in the axial direction, or to have a large sheet thickness so as to increase the deformation strength.

The coating film 13 of an electrodeposition paint is formed in the gap 11 during electrodeposition coating, which is a general coating process in automobile manufacturing (see FIG. 1). As examples of the type of electrodeposition paint, a polyurethane cationic electrodeposition paint, an epoxy cationic electrodeposition paint, a urethane cationic electrodeposition paint, an acrylic anionic electrodeposition paint, a fluororesin electrodeposition paint, and the like are named, for example. The electrodeposition coating will be specifically described in a second embodiment described later.

Normally, when electrodeposition coating is performed, a coating film of about 0.05 mm is formed on the surface of a steel sheet. However, in the present embodiment, the coating part 5 is provided on the outer surface side of the outer part 7 in the pre-coated part 2 and hence, the electrodeposition paint enters the gap 11 to form a coating layer, and the coating layer is subjected to heat treatment, whereby the coating film 13 having a thickness of 0.2 mm or more and 3 mm or less as illustrated in FIG. 1 can be formed. The reason why the crashworthiness energy absorbing effect of the automotive crashworthiness energy absorption part 1 is improved by forming such a coating film 13 will be described below.

In a course of a crashworthiness load being input to a tip end of the automotive crashworthiness energy absorption part in the axial direction and the tubular member exceeding buckling strength and being axially crushed, the automotive crashworthiness energy absorption part including the tubular member formed of a metal sheet such as a steel sheet absorbs crashworthiness energy by repeatedly causing buckling deformation in a bellows shape in the tubular member.

However, a bellows-shaped bent portion has a small curvature radius unique to a metal sheet, so that stress is concentrated on the outer surface of the bent portion and fracture is likely to occur. If fracture occurs in the bent portion in the course of axial crushing, the crashworthiness energy absorbing effect is significantly reduced. Therefore, in order to improve the crashworthiness energy absorbing effect, it has been necessary to prevent the fracture occurring in the tubular member that buckles and deforms in a bellows shape.

Figure 3:
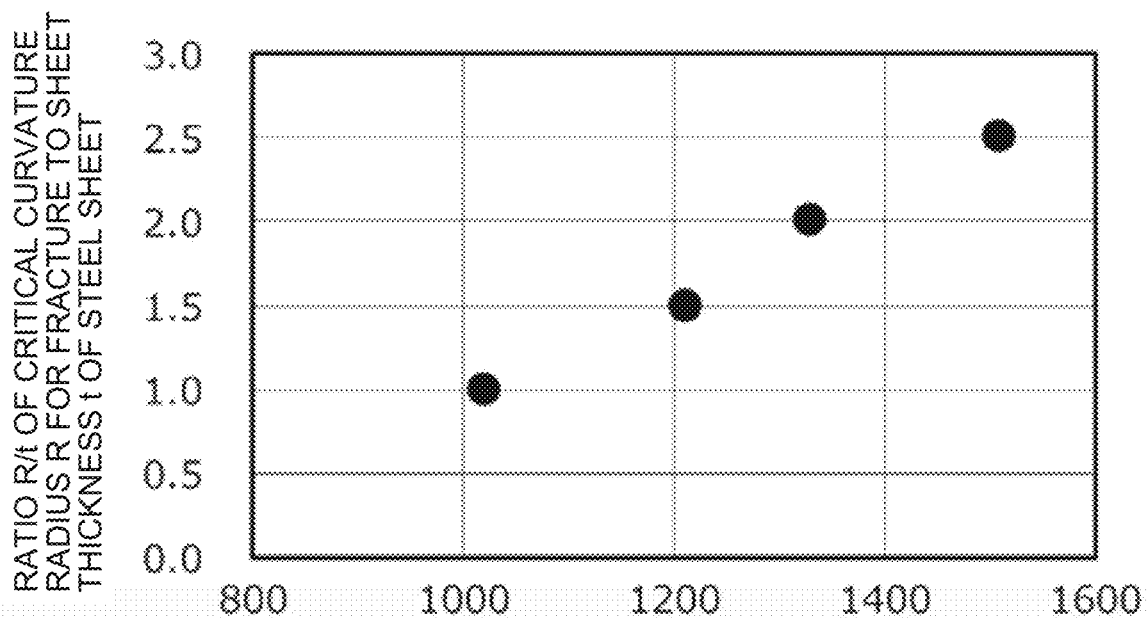
FIG. 3 is a graph illustrating a relationship between tensile strength of a steel sheet and a ratio of a critical curvature radius for fracture to a sheet thickness of the steel sheet.

In particular, in recent years, high-strength steel sheets adopted for automotive parts for the purpose of achieving both crashworthiness characteristics and weight reduction of automotive bodies have a small elongation as compared with conventional strength steel sheets. The relationship between the steel sheet tensile strength level and the critical curvature radius R for fracture/sheet thickness t of the steel sheet illustrated in Table 1 and FIG. 3 (see the following Reference 1) indicates that, in a case of the same sheet thickness, the higher the tensile strength TS of the steel sheet, the more likely fracture occurs even if the curvature radius is large. That is, when the automotive crashworthiness energy absorption part using a high-strength steel sheet buckles and deforms in a bellows shape, fracture is likely to occur in a bent tip end in the bellows shape with an increase in steel sheet strength. This has been also a factor that hinders further development of enhancing strength of steel sheets used for automotive crashworthiness energy absorption parts for weight reduction of automotive bodies of automobiles. (Reference 1) Hasegawa Kohei, Kaneko Shinjiro, Seto Kazuhiro, "Cold-rolled and Galvannealed (GA) High Strength Steel Sheets for Automotive Cabin Structure", JFE Technical Report, No. 30 (August 2012), p. 6-12.

TABLE 1

| Steel sheet strength level | TS [MPa] | R/t [—] |
|---|---|---|
| 780 MPa-class | 810 | Less than 1.0 |
| 980 MPa-class | 1020 | 1.0 |
| 1180 MPa-class | 1210 | 1.5 |
| 1320 MPa-class | 1330 | 2.0 |
| 1470 MPa-class | 1510 | |

On the other hand, in the present invention, when the tubular member 3 buckles and deforms in a bellows shape at the time of collision, an object is interposed and sandwiched between a metal sheet and a metal sheet at a bending portion deformed in a concave shape and compressed, thereby increasing the curvature radius of the bending portion deformed in the concave shape, so that fracture of the bent tip end of the bellows shape is prevented. Here, the object interposed between the metal sheet and the metal sheet is preferably an object as lightweight as possible to prevent the weight of the automotive crashworthiness energy absorption part from increasing. Moreover, the object is preferably an object that can be manufactured using a conventional automobile manufacturing line as it is without requiring additional material or process in part manufacturing as in a foam resin or the like in the conventional example. In view of the above, in the present invention, a coating for electrodeposition coating, which is generally performed in automobile manufacturing, is utilized.

In addition, in the tubular member 3, a region capable of highly absorbing crashworthiness energy is the corner portion 7c that connects the top portion 7a and the side-wall portion 7b. However, the corner portion 7c is also a region that is most likely subjected to machining and where work hardening occurs when the outer part 7 is press formed, and the elongation thereof is further reduced by the work hardening. Therefore, the bent tip end portion of the bellows shape in the corner portion 7c is a region where fracture is particularly likely to occur.

In view of the above, in the present invention, the coating part 5 is provided on the outer surface side of the outer part 7 including the corner portions 7c such that the gap 11 of 0.2 mm to 3 mm is formed between the coating part 5 and the outer surface. Therefore, the electrodeposition paint enters the gap 11 during electrodeposition coating, and a coating layer having a predetermined thickness can be formed. The coating layer is cured in a baking process of electrodeposition coating, is fixed in the gap 11, and becomes the coating film 13. The automotive crashworthiness energy absorption part 1 according to the present embodiment can suppress, when the tubular member 3 has buckled and deformed at the time of collision, occurrence of fracture of the bent tip end portion of a bellows shape by interposing the coating film 13 inside the concave-shaped bending portion of the bellows shape to increase the curvature radius of the concave-shaped bending portion. Therefore, the crashworthiness energy absorbing effect is improved. Note that the appropriate thickness of the coating film 13 being from 0.2 mm to 3 mm will be described in examples described later.

The coating film 13 in the automotive crashworthiness energy absorption part 1 according to the present embodiment also functions as a vibration-damping material that absorbs vibration. For example, in a case where the automotive crashworthiness energy absorption part 1 is used as a front side member, which is a part that absorbs crashworthiness energy by axial crushing, the coating film 13 absorbs vibration of an automotive engine mounted on the front side member, thereby improving vibration-damping properties. The advantageous effects of improving the vibration-damping properties will also be described in the examples described later.

As described above, the coating part 5 is intended to form the coating film 13 having a predetermined thickness during electrodeposition coating and does not require strength. Therefore, the coating part 5 may have a lower strength and a thinner sheet thickness as compared with the outer part 7 and the inner part 9. Furthermore, if the strength of the coating part 5 is too high, smooth buckling deformation in a bellows shape of the tubular member 3 at the time of collision is hindered. Therefore, the strength is preferably 440 MPa-class or less, for example.

Second Embodiment

In the present embodiment, a method for manufacturing the automotive crashworthiness energy absorption part 1 described in the first embodiment will be described. The method for manufacturing the automotive crashworthiness energy absorption part 1 according to the present embodiment includes a part manufacturing process of manufacturing the pre-coated part 2 in which the coating part 5 is provided on the tubular member 3, and a coating process of forming a coating layer on the pre-coated part 2 after the pre-coated part 2 is attached to an automotive body and forming the coating film 13 by thermosetting the coating layer by baking treatment. Each process will be specifically described below with reference to FIG. 4, which is cross-sectional views of the automotive crashworthiness energy absorption part 1 illustrated in FIGS. 1 and 2.

<Part Manufacturing Process>

The part manufacturing process is a process of manufacturing the pre-coated part 2 in which the coating part 5 is provided on the outer surface side of the tubular member 3 formed by joining the outer part 7 and the inner part 9. As illustrated in an example in FIG. 4(a), the coating part 5 is installed on the outer side of the outer part 7 in a range including the corner portions 7c with the gap 11 of 0.2 mm to 3 mm between the coating part 5 and the outer surface of the outer part 7, and is joined to the outer surfaces of the side-wall portions 7b by spot welding or the like. In addition, the coating part 5 may be brought into contact with the top portion 7a of the outer part 7 to be further joined (see FIGS. 6(b) and 7(b)). Either the joining of the outer part 7 and the inner part 9 or the joining of the outer part 7 and the coating part 5 may be performed first.

<Coating Process>

The coating process is a process of forming the coating film 13 in the gap 11. In a state of being attached to an automotive body, the pre-coated part 2 manufactured in the part manufacturing process described above is subjected to electrodeposition coating, which is generally performed in the course of automobile manufacturing, whereby the coating film 13 is formed in the gap 11. Hereinafter, the process will be described while outlining electrodeposition coating and other coating processes in automobile manufacturing.

In general, in order to improve weatherability, design, anticorrosion properties, and the like, a steel sheet of an automotive body of an automobile is sequentially subjected to electrodeposition coating, intermediate coat coating, top coat base coating, and top coat clear coating. In particular, the electrodeposition coating, which the steel sheet is first subjected to, is an important process to improve rust prevention of the automotive body, and has been widely used. In the electrodeposition coating, a treatment for forming a coating layer on the steel sheet by electrodeposition and a treatment for curing the coating layer using a drying furnace (oven) or the like are performed. Hereinafter, an example of the electrodeposition coating will be described, and the correspondence with the coating process in the present embodiment will be given.

In general electrodeposition coating, first, as a pretreatment, a surface treatment such as degreasing, washing, or a chemical conversion treatment is performed on an automotive part formed by press-forming or the like of a steel sheet. Thereafter, the automotive part on which the surface treatment has been performed is immersed into an electrodeposition tank containing an electrodeposition paint to electrically conduct an object to be coated (automotive part) as a cathode and the electrodeposition paint as an anode. Accordingly, a coating layer of the electrodeposition paint is formed on the surface of the steel sheet (cationic electrodeposition coating). The automotive part in which the coating layer of the electrodeposition paint is formed on the surface by electrical conduction in the electrodeposition tank is subjected to the subsequent treatment such as washing and conveyed to a high-temperature drying furnace (oven), and the coating layer is cured by baking treatment.

Similarly, when the pre-coated part 2 (see FIG. 4(a)) manufactured in the part manufacturing process in the present embodiment is immersed in the electrodeposition tank described above in a state of being attached to the automotive body frame, the electrodeposition paint enters the gap 11, and a coating layer is formed by the subsequent electrical conduction. The coating layer of the electrodeposition paint is formed also on the surface of the steel sheet in a region other than the gap 11, but the thickness thereof is as thin as about 0.05 mm, and thus illustration is omitted.

The automotive crashworthiness energy absorption part 1 on which the coating layer is formed is then subjected to the baking treatment described above and the coating layer is cured, and the coating film 13 having a predetermined thickness is fixed in the gap 11 (FIG. 4(b)). Note that the coating film 13 is preferably formed in a solid state over the entire region in the gap 11, but a case is conceivable where the coating film 13 is formed in a state in which a void exists in a portion of the gap 11. Even in such a case, the advantageous effects of the present invention can be achieved as compared with a case where there is no coating film 13. Therefore, a case where a void exists in a portion of the gap 11 is not excluded.

The electrodeposition coating has high deposition properties to an object to be coated (properties of spreading coating to an uncoated portion). Therefore, the electrodeposition coating is particularly effective for inner sheet members having many irregularities (such as an automotive body frame portion and an engine room). There are various types of electrodeposition paints, and the electrodeposition paints are selectively used according to a coating target and requested functions (deposition properties, energy saving, anticorrosion properties, and the like). It is assumed that electrodeposition coating with a flexible coating film mainly used for an inner sheet (interior) is applied for the automotive crashworthiness energy absorption part 1 of the present invention, and as examples of the type, a polyurethane cationic electrodeposition paint, an epoxy cationic electrodeposition paint, a urethane cationic electrodeposition paint, an acrylic anionic electrodeposition paint, a fluororesin electrodeposition paint, and the like can be named, for example.

The automotive part subjected to the electrodeposition coating is subjected to intermediate coat coating, top coat base coating, and top coat clear coating. These coatings are mainly performed using a method, referred to as electrostatic painting, of spraying charged coating onto an object to be coated using spray and the like. The intermediate coat coating has functions of roughness masking and light transmittance restraining for an electrodeposition coating surface, and the top coat base coating and the top coat clear coating have functions of design such as coloring, durability, and the like. As examples of coating used for the intermediate coat coating, the top coat base coating, and the top coat clear coating, a polyester-melamine paint, an acrylic-melamine paint, an acrylic-polyester-melamine paint, an alkyd-polyester-melamine paint, and the like are named.

As described above, according to the method for manufacturing the automotive crashworthiness energy absorption part 1 described in the present embodiment, the coating part 5 is provided on the tubular member 3. Therefore, the coating film 13 of an electrodeposition paint is formed in the gap 11 between the tubular member 3 and the coating part 5 during electrodeposition coating, which is generally performed in the coating process in automobile manufacturing. Accordingly, it is possible to manufacture the automotive crashworthiness energy absorption part 1 having high crashworthiness energy absorbing effect without significantly increasing the production cost.

Figure 4:
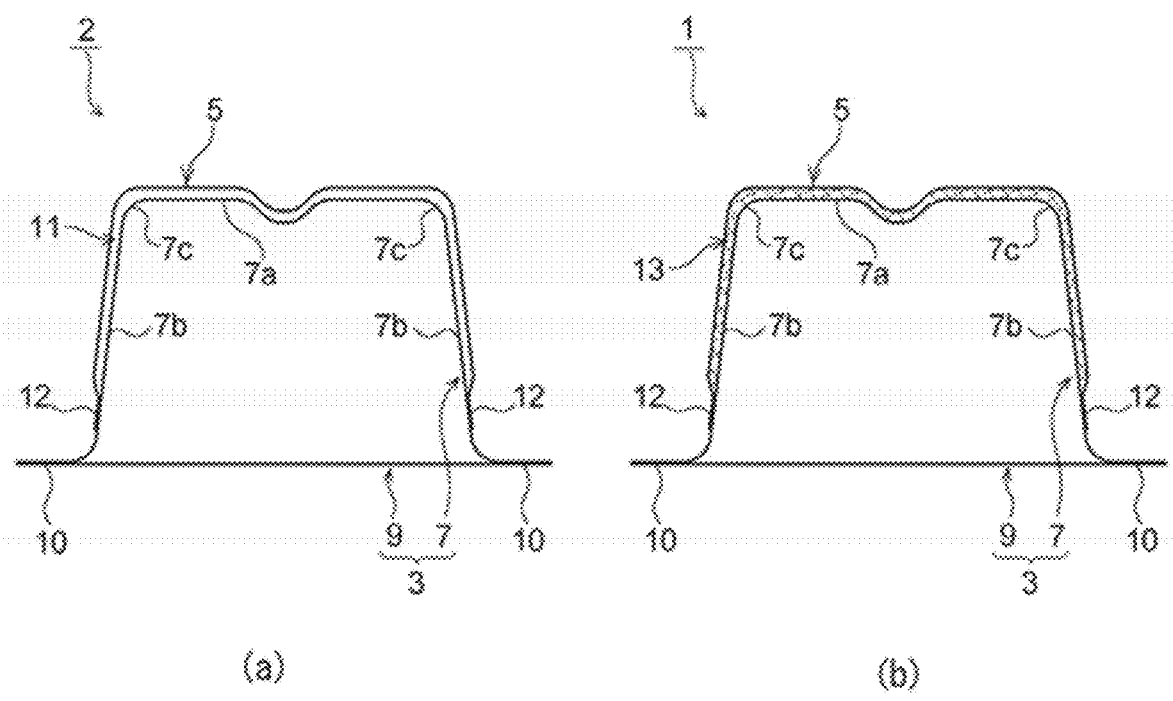
FIG. 4 is an explanatory view of a method for manufacturing an automotive crashworthiness energy absorption part according to a second embodiment of the present invention.
Figure 5:
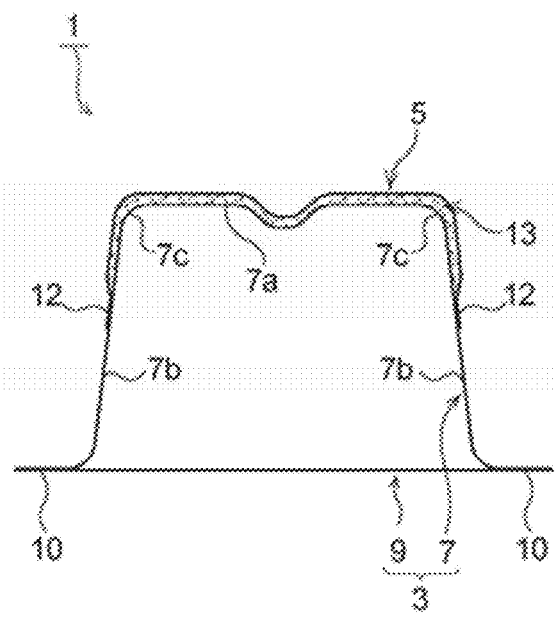
FIG. 5 is a view illustrating another aspect of the automotive crashworthiness energy absorption part according to the present invention (part 1).
Figure 6:
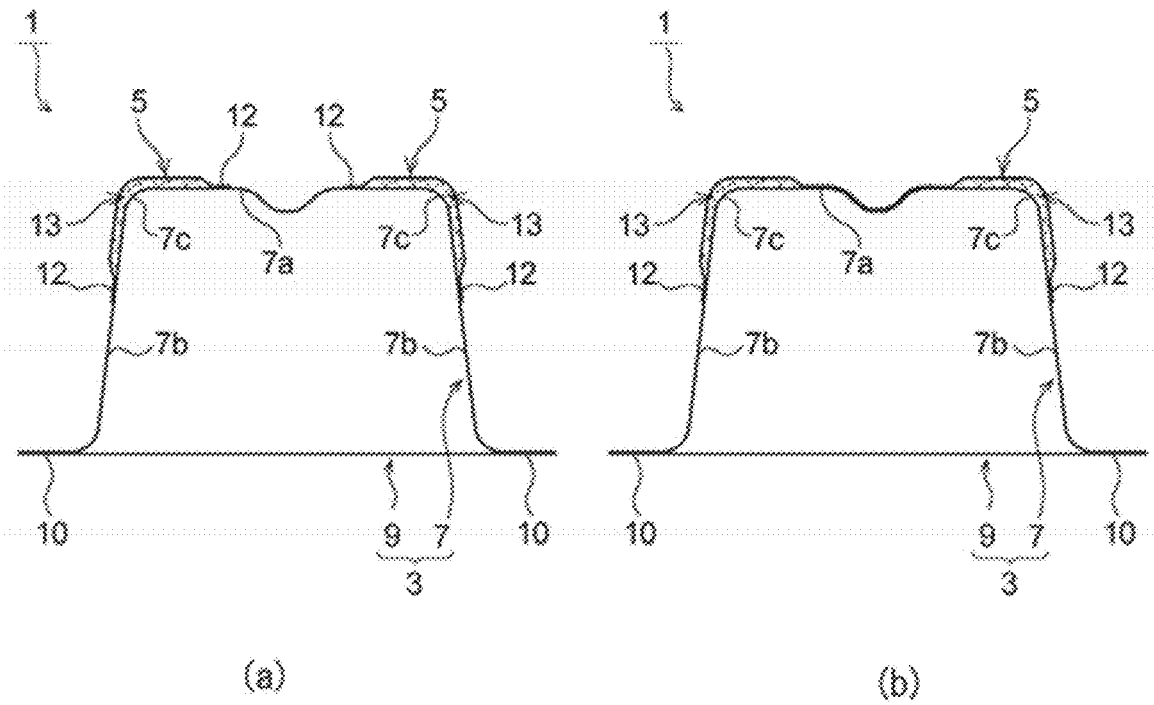
FIG. 6 is a view illustrating another aspect of the automotive crashworthiness energy absorption part according to the present invention (part 2).

In the first and second embodiments, as illustrated in the cross-sectional views in FIG. 4, an example has been described in which the joining portions 12 of the coating part 5 are provided on the side-wall portions 7b of the outer part 7, and the coating film 13 is formed over the outer surfaces of the top portion 7a, the corner portions 7c, and portions of the side-wall portions 7b. However, the present invention is not limited thereto. For example, as illustrated in FIG. 5, the coating film may be formed mainly on the outer surfaces of the top portion 7a and the corner portions 7c and only slightly on outer surfaces of the side-wall portions 7b. In addition, as described above, if the coating film is formed on the outer surfaces of the corner portions 7c where fracture is particularly likely to occur at the time of collision, the crashworthiness energy absorbing effect can be expected to be improved. Therefore, as illustrated in FIG. 6, the coating film 13 may be formed mainly on the outer surfaces of the corner portions 7c. In this process, two coating parts 5 may be used and joining portions 12 may each be provided on the top portion 7a and the side-wall portion 7b (FIG. 6(a)), or one coating part 5 may be used and brought into contact with the center of the top portion 7a to be further joined, and the joining portions 12 may be provided on the side-wall portions 7b (FIG. 6(b)).

Figure 7:
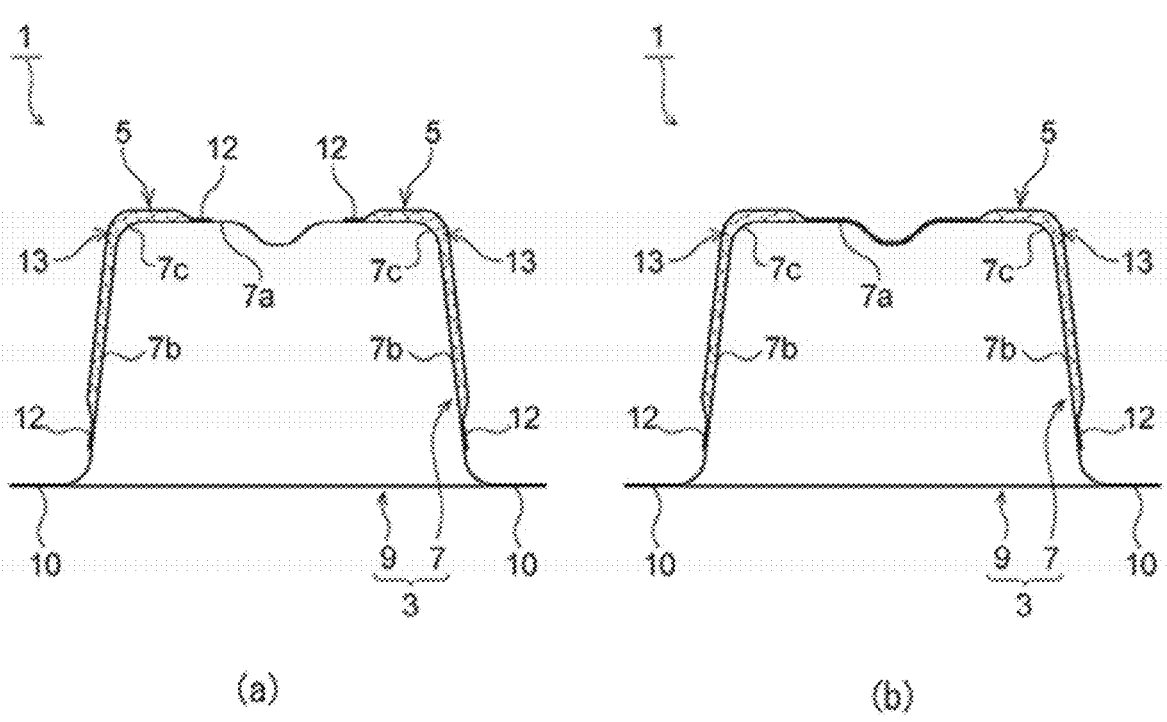
FIG. 7 is a view illustrating another aspect of the automotive crashworthiness energy absorption part according to the present invention (part 3).
Figure 8:
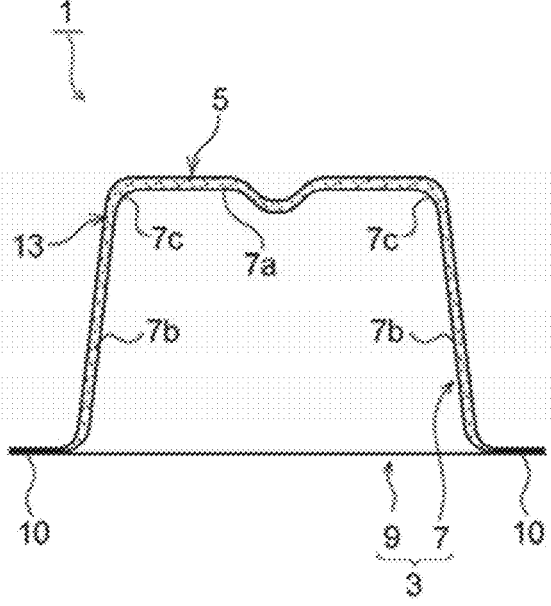
FIG. 8 is a view illustrating another aspect of the automotive crashworthiness energy absorption part according to the present invention (part 4).

In addition, as illustrated in FIG. 7, the coating film 13 may be formed on the outer surfaces of the side-wall portions 7b and the corner portions 7c. Similarly to FIG. 6, two coating parts 5 may be used and the joining portions 12 may each be provided on the top portion 7a and the side-wall portion 7b (FIG. 7(a)), or one coating part 5 may be used and brought into contact with the center of the top portion 7a to be further joined, and the joining portions 12 may be provided on the side-wall portions 7b (FIG. 7(b)). Moreover, as illustrated in FIG. 8, the coating part 5 of a hat-shaped cross section type may be fitted on the outer part 7 and the inner part 9, and joined at the joining portions 10.

Figure 9:
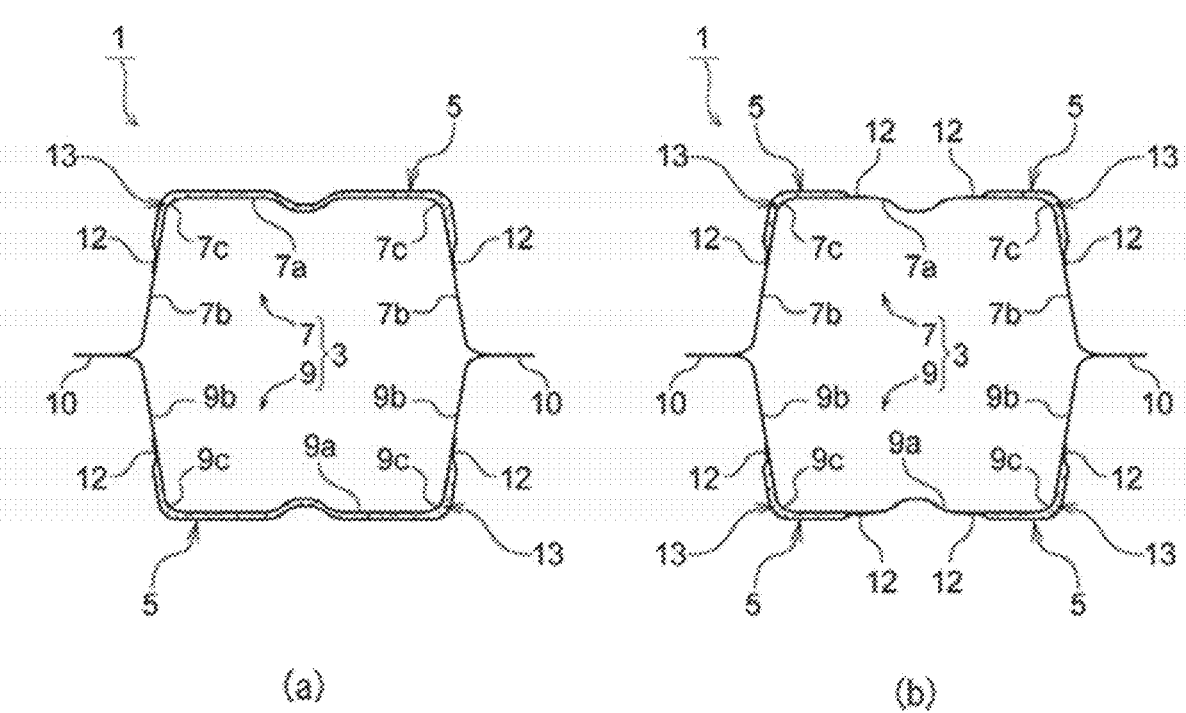
FIG. 9 is a view illustrating another aspect of the automotive crashworthiness energy absorption part according to the present invention (part 5).
Figure 9:
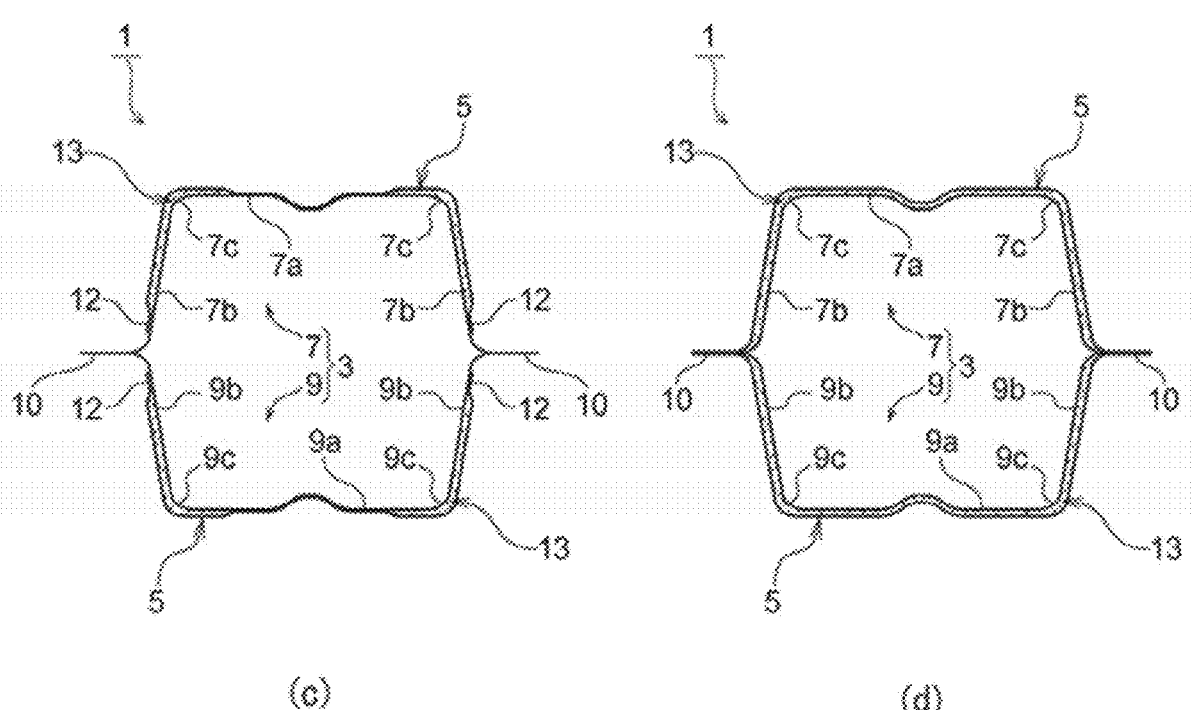

In the present embodiment, the tubular member 3 including the outer part 7 having a hat-shaped cross section shape and the inner part 9 having a flat sheet shape is used as an example, but the present invention is not limited thereto. As illustrated in examples in FIG. 9, the present embodiment is also applicable to a tubular member formed by making hat-shaped section parts face each other and combining the flange portions. FIG. 9(*a*) is an example in which the coating part 5 of the aspect illustrated in FIG. 5 is provided on each of the hat-shaped section parts facing each other. Similarly, FIG. 9(*b*) is an example in which the coating part 5 of the aspect illustrated in FIG. 6(*a*) is provided, FIG. 9(*c*) is an example in which the coating part 5 of the aspect illustrated in FIG. 7(*b*) is provided, and FIG. 9(*d*) is an example in which the coating part 5 of the aspect illustrated in FIG. 8 is provided. Note that in FIG. 9, the outer parts 7 are denoted by the same reference numerals as those in FIG. 4 to FIG. 8, and the inner parts 9 are denoted by the reference numerals corresponding to the outer parts 7. In addition, FIG. 9 illustrates examples in which the outer part 7 and the inner part 9 are hat-shaped section parts having the same shape, but the inner part 9 may also be a hat-shaped section part having a shape different from that of the outer part 7.

EXAMPLES

Experiments were performed to confirm the advantageous effects of the automotive crashworthiness energy absorption part 1 according to the present invention, and the results thereof will be described below.

In the present example, the automotive crashworthiness energy absorption part according to the present invention was used as a test specimen, and evaluation of crashworthiness energy absorption characteristics by an axial crushing test and evaluation of damping characteristics by measuring a frequency response function and calculating a character frequency in an impact vibration test were performed.

Figure 10:
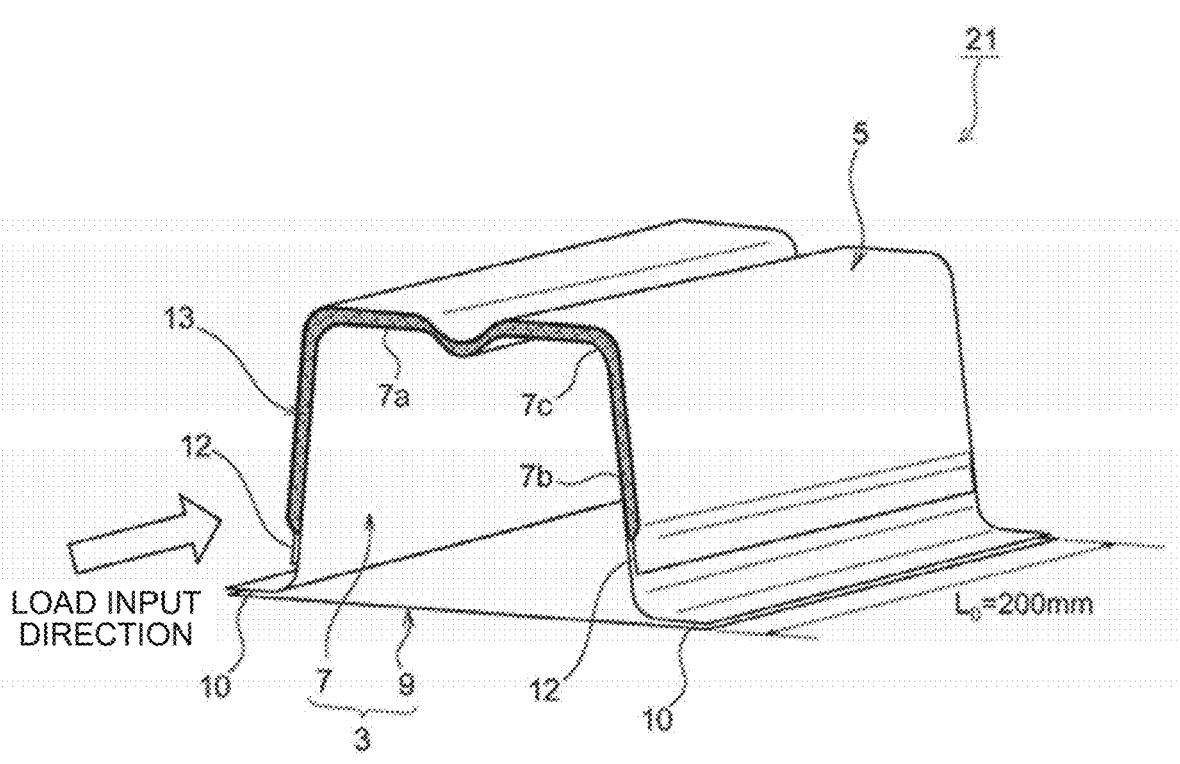
FIG. 10 is a view for describing an axial crushing test method in an example.

In the axial crushing test, as illustrated in FIG. 10, a load was input to a test specimen 21 including the tubular member 3 in the axial direction at a test speed of 17.8 m/s, then a load-stroke curve indicating a relationship between a load and a stroke (amount of axial crush deformation) was measured when the test specimen 21 underwent an axial crush deformation of 80 mm from a test specimen length (an axial length L0 of the test specimen 21) of 200 mm to 120 mm. Furthermore, taking images with a high-speed camera was performed to observe the state of deformation and the presence or absence of the occurrence of fracture in the tubular member 3. Moreover, absorbed energy at a stroke of from 0 to 80 mm was obtained from the measured load-stroke curve.

Figure 11:
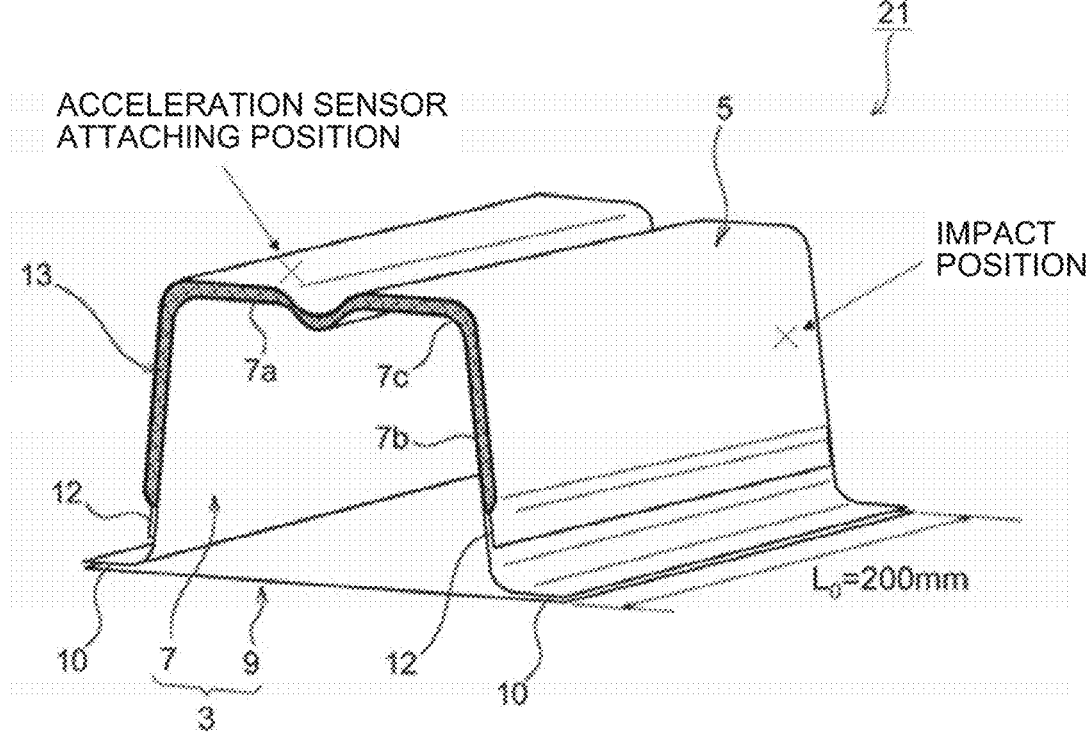
FIG. 11 is a view for describing an impact vibration test method in the example.
Figure 12:
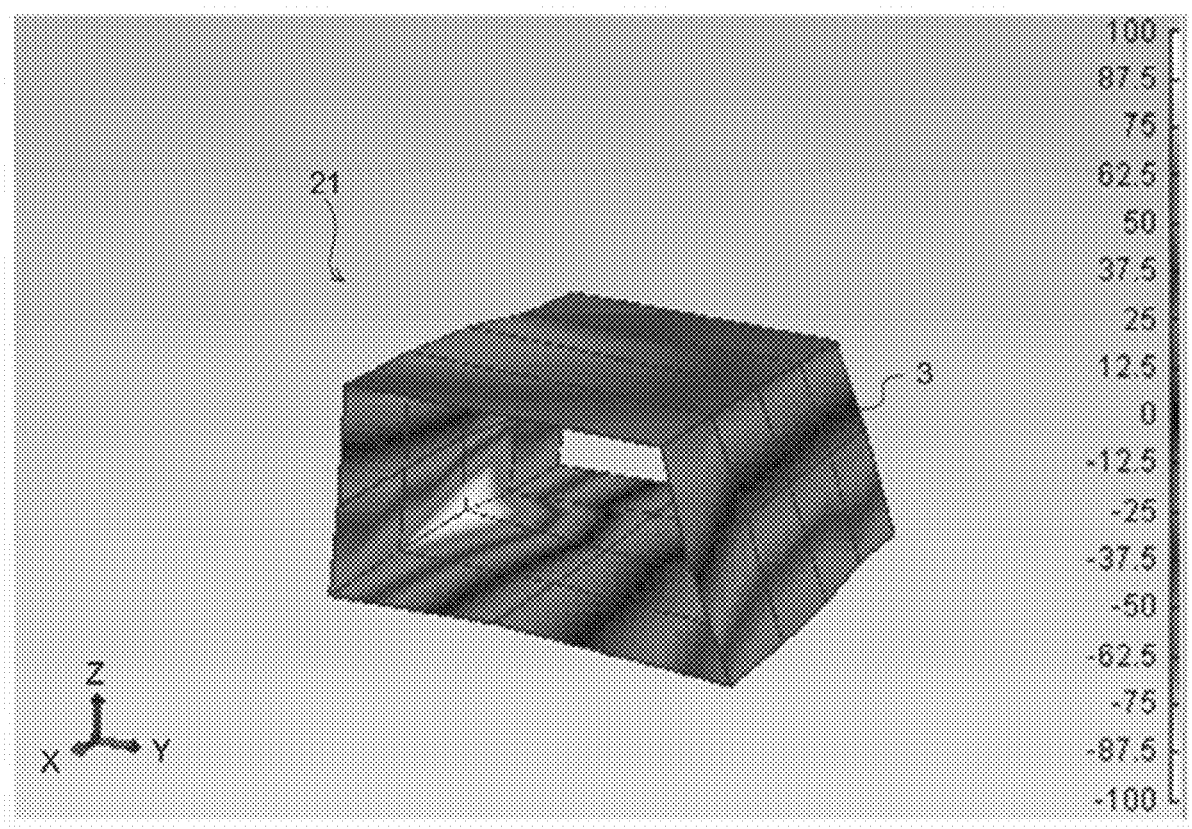
FIG. 12 is a view illustrating a vibration mode as a target for the calculation of a character frequency in vibration characteristic evaluation by the impact vibration test method in the example.

On the other hand, in the impact vibration test, as illustrated in FIG. 11, an acceleration sensor (manufactured by Ono Sokki Co., Ltd.: NP-3211) was attached to the hanging test specimen 21 near an edge on the inner side of the top portion 7*a* of the outer part 7. Then, impact vibration was applied to the inner side of the side-wall portion 7*b* of the outer part 7 of the test specimen 21 with an impact hammer (manufactured by Ono Sokki Co., Ltd.: GK-3100), an impact force and acceleration generated in the test specimen 21 were taken into an FFT analyzer (manufactured by Ono Sokki Co., Ltd.: CF-7200A), and a frequency response function was calculated. Here, the frequency response function was calculated by averaging processing and curve fitting of five strokes. Then, vibration mode analysis was performed by using the calculated frequency response function, and a character frequency in the same mode was obtained. FIG. 12 illustrates a target vibration mode.

Figure 13:
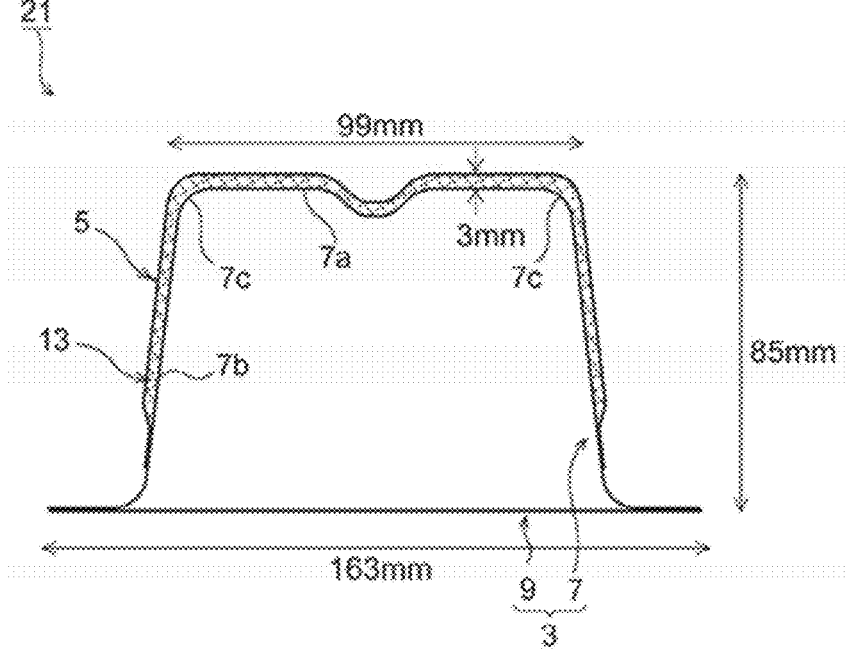
FIG. 13 is a view illustrating a structure of a test specimen used as an invention example in the example.

FIG. 13 illustrates the structure and the shape of the test specimen 21 that is the automotive crashworthiness energy absorption part 1 (FIG. 1 and FIG. 4 (*b*)) in which the coating film 13 according to the first and second embodiments described above is formed. The test specimen 21 includes the tubular member 3 in which the outer part 7 and the inner part 9 are joined by spot welding, and the coating part 5 is joined to the outer surfaces of the side-wall portions 7*b* of the outer part 7. The coating film 13 is formed between the outer part 7 and the coating part 5.

FIG. 13 illustrates an example in which the gap 11 that is formed from the top portion 7*a*, the corner portions 7*c*, and to the side-wall portions 7*b*, and between them and the coating part 5 is 3 mm. However, in the present example, test specimens 21 having the gap 11 of 2 mm, 1 mm, and 0.2 mm were also prepared, and the test was performed while changing the thickness of the coating film 13 formed in the gap 11.

Figure 14:
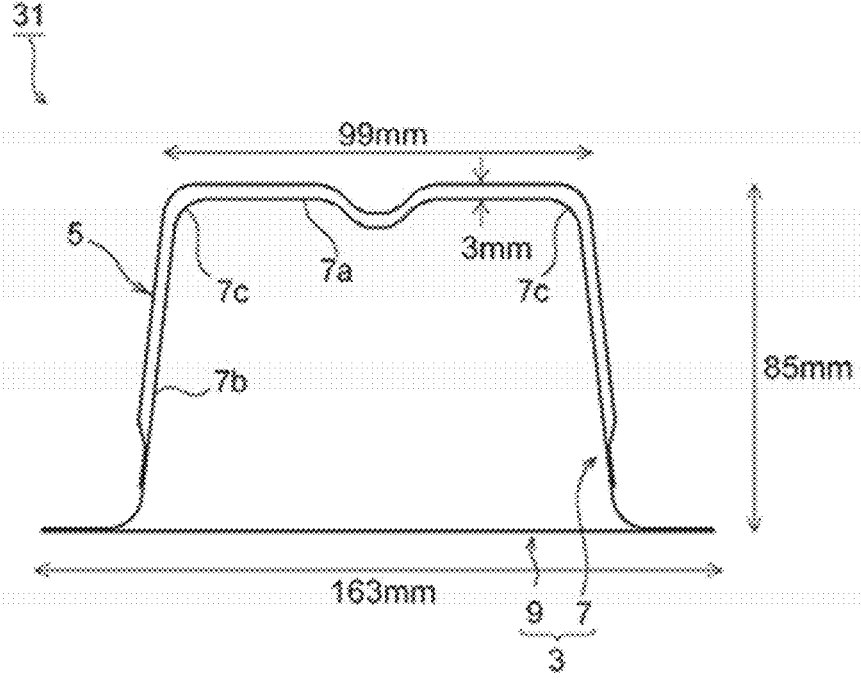
FIG. 14 is a view illustrating a structure of a test specimen used as a comparative example in the example.

Moreover, as comparative examples, as illustrated in FIG. 14, test specimens 31 including the tubular member 3 and the coating part 5 and in which the coating film 13 is not formed are prepared, and the axial crushing test and the impact vibration test were performed similarly to invention examples. Table 2 illustrates the structures of the test specimens 21 that are the invention examples and the test specimens 31 that are the comparative examples, conditions of the coating films, and weights of the test specimens, furthermore, calculation results of absorbed energy when the axial crushing test was performed, and results of character frequency obtained by the impact vibration test.

TABLE 2

| | Structure | | | | | | |
| | (1) Outer part | | (2) Coating part | | (3) Inner part | | |
| | Material [MPa] | Sheet thickness [mm] | Material [MPa] | Sheet thickness [mm] | Material [MPa] | Sheet thickness [mm] | Gap between (1) and (2) |
|---|---|---|---|---|---|---|---|
| Invention example 1 | 590 | 1.2 | 270 | 0.5 | 590 | 1.2 | 3 |
| Invention example 2 | 590 | 1.2 | 270 | 0.5 | 590 | 1.2 | 2 |
| Invention example 3 | 590 | 1.2 | 440 | 0.5 | 590 | 1.2 | 2 |
| Invention example 4 | 1180 | 1.2 | 270 | 0.5 | 590 | 1,2 | 1 |

TABLE 2-continued

| | | | | | | | |
|---|---|---|---|---|---|---|---|
| Invention example 5 | 1180 | 1.2 | 270 | 0.5 | 590 | 1.2 | 0.2 |
| Comparative example 1 | 590 | 1.2 | 270 | 0.5 | 590 | 1.2 | 3 |
| Comparative example 2 | 590 | 1.4 | 270 | 0.5 | 590 | 1.2 | 2 |
| Comparative example 3 | 980 | 1.2 | 270 | 0.5 | 590 | 1.2 | 1 |
| Comparative example 4 | 1180 | 1.2 | 270 | 0.5 | 590 | 1.2 | 1 |
| Comparative example 5 | 1180 | 1.2 | — | — | 590 | 1.2 | — |
| Comparative example 6 | 590 | 1.2 | 780 | 0.5 | 590 | 1.2 | 3 |

| | Coating film | | Weight of test | Presence or absence of fracture | Absorbed energy [Test speed | | Vibration characteristics [Character |
|---|---|---|---|---|---|---|---|
| | Presence or absence | Thickness [mm] | specimen [kg] | in tubular member | 17.8 m/s] | | frequency] |
| | | | | | [kJ] | [kJ/kg] | [Hz] |
| Invention example 1 | Presence | 3 | 1.28 | Absence | 11.1 | 8.7 | 430 |
| Invention example 2 | Presence | 2 | 1.21 | Absence | 9.0 | 7.4 | 340 |
| Invention example 3 | Presence | 2 | 1.21 | Absence | 9.5 | 7.9 | 340 |
| Invention example 4 | Presence | 1 | 1.17 | Absence | 11.2 | 9.6 | 310 |
| Invention example 5 | Presence | 0.2 | 1.10 | Absence | 10.7 | 9.7 | 280 |
| Comparative example 1 | Absence | — | 1.08 | Absence | 6.5 | 6.0 | 155 |
| Comparative example 2 | Absence | — | 1.19 | Absence | 7.0 | 5.9 | 175 |
| Comparative example 3 | Absence | — | 1.08 | Presence | 8.1 | 7.5 | 155 |
| Comparative example 4 | Absence | — | 1.09 | Presence | 8.5 | 7.8 | 155 |
| Comparative example 5 | Presence | 0.05 | 0.96 | Presence | 8.7 | 9.1 | 155 |
| Comparative example 6 | Presence | 3 | 1.28 | Presence | 8.1 | 6.3 | 350 |

In each of the invention examples 1 to 5, the test specimen 21 (FIG. 13) including the coating part 5 and the coating film 13 was used, and the strength (material) of the outer part 7 and the coating part 5, and the thickness of the coating film 13 were changed. On the other hand, in the comparative examples 1 to 4, the test specimen 31 (FIG. 14) including the coating part 5 but not formed with the coating film 13 was used, and the strength (material) and a sheet thickness of the outer part 7, and the gap 11 between the outer part 7 and the coating part 5 were changed. In the comparative example 5, a coating film was formed without including the coating part 5. In the comparative example 6, the coating part 5 and the coating film 13 were included similarly to the test specimen 21, but the strength of the material of the coating part 5 exceeds that of the material of the outer part 7 and the inner part 9.

For the test specimens formed with the coating film 13, the weight of the test specimen illustrated in Table 2 is the sum of the respective weights of the outer part 7, the inner part 9, the coating part 5, and the coating film 13. For the test specimens without the coating film 13 (the comparative examples 1 to 4), the weight of the test specimen is the sum of the respective weights of the outer part 7, the inner part 9, and the coating part 5.

In the comparative example 1, the weight of the test specimen was 1.08 kg, and the absorbed energy was 6.5 kJ. Moreover, the character frequency was 155 Hz.

In the comparative example 2, the sheet thickness of the outer part 7 and the gap between the outer part 7 and the coating part 5 were changed from those in the comparative example 1, and the weight of the test specimen was 1.19 kg, and the absorbed energy was 7.0 kJ, which was increased as compared with the comparative example 1. The character frequency was 175 Hz.

In the comparative example 3, a high-strength steel sheet of 980 MPa-class was used for the outer part 7, and the weight of the test specimen was 1.08 kg. The absorbed energy was 8.1 kJ, which was further increased as compared with the comparative example 2, but fracture occurred in the tubular member 3. The character frequency was 155 Hz.

In the comparative example 4, a high-strength steel sheet of 1180 MPa-class was used for the outer part 7, and the weight of the test specimen was 1.09 kg. The absorbed energy was 8.5 kJ, which was further increased as compared with the comparative example 3, but fracture occurred in the tubular member 3. The character frequency was 155 Hz.

In the comparative example 5, a high-strength steel sheet of 1180 MPa-class was used for the outer part 7, and a coating film was formed without installing the coating part 5, and the thickness of the coating film 13 was 0.05 mm. The weight of the test specimen was 0.96 kg, and the absorbed energy was 8.7 kJ, which was increased as compared with the comparative example 4, but fracture occurred in the tubular member 3. The character frequency was 155 Hz.

In the comparative example 6, the strength of the material of the coating part 5 exceeds that of the material of the outer part 7 and the inner part 9 (tubular member 3), and the coating film 13 having a thickness of 3 mm was further formed. The weight of the test specimen was 1.28 kg, and the absorbed energy was 8.1 kJ, which was increased as compared with the comparative example 1, but fracture occurred in the tubular member 3. The character frequency was 350 Hz.

In the invention example 1, the test specimen 21 in which a steel sheet having a steel sheet strength of 590 MPa-class was used for the outer part 7, and the thickness of the coating film 13 was 3 mm was used. The absorbed energy in the invention example 1 was 11.1 kJ. The absorbed energy was significantly improved as compared with the absorbed energy (=6.5 kJ) in the comparative example 1 using the same material but not formed with the coating film 13, and fracture did not occur in the tubular member 3. In addition, the absorbed energy was significantly improved even as compared with the comparative example 3 (=8.1 kJ) in which the high-strength steel sheet of 980 MPa-class was used for the outer part 7 and the comparative example 4 (=8.5 kJ) in which the high-strength steel sheet of 1180 MPa-class was used for the outer part 7. The weight of the test specimen (=1.28 kg) in the invention example 1 was increased as compared with the comparative example 1 (=1.08 kg), the comparative example 3 (=1.08 kg), and the comparative example 4 (=1.09 kg), but the absorbed energy per unit weight obtained by dividing the absorbed energy by the weight of the test specimen was 8.7 kJ/kg, which was improved as compared with the comparative example 1 (=6.0 kJ/kg), the comparative example 3 (=7.5 kJ/kg), and the comparative example 4 (=7.8 kJ/kg). In addition, the character frequency in the invention example 1 was 430 Hz, which was significantly increased as compared with the comparative example 1, the comparative example 3, and the comparative example 4 (=155 Hz).

In the invention example 2, the same material as in the invention example 1 was used, and the thickness of the coating film 13 was set to 2 mm. The weight of the test specimen was 1.21 kg, which was lighter in weight than that in the invention example 1 (=1.28 kg). The absorbed energy in the invention example 2 was 9.0 kJ, which was improved as compared with the absorbed energy (=7.0 kJ) in the comparative example 2 having the same shape and in which the sheet thickness of the outer part 7 is large. Fracture did not occur in the tubular member 3. Moreover, the absorbed energy per unit weight in the invention example 2 was 7.4 kJ/kg, which was improved as compared with the comparative example 2 (=5.9 kJ/kg). In addition, the character frequency in the invention example 2 was 340 Hz, which was significantly increased as compared with the comparative example 2 (=175 Hz).

In the invention example 3, the thickness of the coating film 13 was set to 2 mm similarly to the invention example 2, and the steel sheet strength of the coating part 5 was set to 440 MPa-class. In the comparative example 6 in which the steel sheet strength of the coating part 5 was 780 MPa exceeding the steel sheet strength of the outer part 7, fracture occurred in the tubular member 3, but fracture did not occur in the invention example 3. In addition, the absorbed energy in the invention example 3 was 9.5 kJ, which was improved as compared with the comparative example 6 (=8.1 kJ).

In the invention example 4, a high-strength steel sheet having a steel sheet strength of 1180 MPa-class was used for the outer part 7, and the thickness of the coating film 13 was set to 1 mm. The absorbed energy in the invention example 4 was 11.2 kJ, and fracture did not occur in the tubular member 3. The absorbed energy was significantly improved as compared with the comparative example 4 (=8.5 kJ) in which a steel sheet of the same material was used for the outer part 7 and fracture occurred. In addition, the weight of the test specimen in the invention example 4 was 1.17 kg, which was lighter in weight than that in the invention example 1, furthermore, the absorbed energy per unit weight (=9.6 kJ/kg) was improved as compared with the invention example 1 (=8.7 kJ/kg) and the comparative example 4 (=7.8 kJ/kg). Moreover, the character frequency in the invention example 4 was 310 Hz, which was significantly increased as compared with the comparative example 4 (=155 Hz).

In the invention example 5, in the same material as that in the invention example 4, the thickness of the coating film 13 was set to 0.2 mm, which is about the same thickness as a laminate in a normal laminated steel sheet, and the weight of the test specimen was 1.10 kg. The absorbed energy in the invention example 5 was 10.7 kJ, and the absorbed energy per unit weight was 9.7 kJ/kg, which was improved as compared with the comparative example 5 (=9.1 kJ/kg) in which a coating film of 0.05 mm was formed without including the coating part 5. In addition, fracture occurred in the tubular member in the comparative example 5, but fracture did not occur in the invention example 5. Moreover, the character frequency in the invention example 5 was 280 Hz, which was increased as compared with the comparative example 5 (=155 Hz).

Note that, although not illustrated in the table, in a case where the gap between the outer part 7 and the coating part 5 was set to 4 mm or more, that is, in a case where the coating film 13 having a thickness of 4 mm or more was formed, sufficient drying could not be performed in the baking treatment of the electrodeposition coating, and dripping of the coating occurred, and the dried coating film was not formed up to a predetermined gap. Therefore, in the present invention, the appropriate thickness of the coating film 13 was set to 0.2 mm to 3 mm.

In this manner, it has been shown that the automotive crashworthiness energy absorption part 1 according to the present invention can efficiently improve the crashworthiness energy absorbing effect while suppressing an increase in weight in a case where a crashworthiness load is input in the axial direction and causes axial crushing, and the character frequency when an impact is applied increases and the vibration-damping properties can be improved.

Note that the reason why the vibration-damping properties are improved with an increase in the character frequency is as follows. When the character frequency of the tubular member 3, which is a crashworthiness member like the front side member described above, falls within a frequency range of vibration of an engine mounted on the member, sympathetic vibration occurs and the vibration increases. For example, when the engine rotates at 4000 rpm, which is a high rotation range of normal driving, the crankshaft turns at the same rotation speed, and in a four-cycle engine, explosion and vibrates occur once every two rotations. Therefore, the frequency of the vibration is 133 Hz in a four-cylinder engine, 200 Hz in a six-cylinder engine, and 267 Hz in an eight-cylinder engine. Accordingly, with the character frequency of about 280 Hz or more as in the present invention, the sympathetic vibration described above can be reliably prevented, and the vibration-damping properties are improved.

INDUSTRIAL APPLICABILITY

According to the present invention, it is possible to provide: an automotive crashworthiness energy absorption part such as a front side member and a crash box that, when a crashworthiness load is input from the front side or the rear side of an automotive body and causes axial crushing, improves crashworthiness energy absorbing effect by forming a thick coating film of coating on an outer surface, can function as a vibration-damping material that absorbs vibration generated in the automotive body, and can reduce additional production processes, thus preventing a large increase in the production cost; and a method for manufacturing the automotive crashworthiness energy absorption part.

REFERENCE SIGNS LIST

1 AUTOMOTIVE CRASHWORTHINESS ENERGY ABSORPTION PART
2 PRE-COATED PART
3 TUBULAR MEMBER
5 COATING PART
7 OUTER PART
7a TOP PORTION
7b SIDE-WALL PORTION
7c CORNER PORTION
9 INNER PART
9a TOP PORTION
9b SIDE-WALL PORTION
9c CORNER PORTION
10 JOINING PORTION (TUBULAR MEMBER)
11 GAP
12 JOINING PORTION (COATING PART)
13 COATING FILM
21 TEST SPECIMEN (INVENTION EXAMPLE)
31 TEST SPECIMEN (COMPARATIVE EXAMPLE)

The invention claimed is:

1. An automotive crashworthiness energy absorption part for being provided in a front portion or a rear portion of an automotive body, the automotive crashworthiness energy absorption part being axially crushed when a crashworthiness load is input from a front side or a rear side of the automotive body to absorb crashworthiness energy, and comprising:

a tubular member formed by using a hat-shaped section part including a top portion and a side-wall portion;

a coating part made of a material having a lower strength than the tubular member, the coating part being arranged on outer surfaces of the top portion and the side-wall portion at a portion including a corner portion configured to connect the top portion and the side-wall portion, with a gap of 0.2 mm or more and 3 mm or less from the outer surface of the top portion, the outer surface of the side-wall portion, and an outer surface of the corner portion; and a coating film of an electrodeposition paint formed in the gap by electrodeposition coating with a flexible coating film for an inner sheet, wherein the electrodeposition paint is one of: a polyurethane cationic electrodeposition paint; an epoxy cationic electrodeposition paint; a urethane cationic electrodeposition paint; an acrylic anionic electrodeposition paint; and a fluororesin electrodeposition paint.

2. A method for manufacturing an automotive crashworthiness energy absorption part provided in a front portion or a rear portion of an automotive body, the automotive crashworthiness energy absorption part being axially crushed when a crashworthiness load is input from a front side or a rear side of the automotive body to absorb crashworthiness energy, the method comprising:

a part manufacturing step of manufacturing a pre-coated part including: a tubular member formed by using a hat-shaped section part including a top portion and a side-wall portion; and a coating part made of a material having a lower strength than the tubular member, the coating part being arranged on an outer surface of the tubular member at a portion including a corner portion configured to connect the top portion and the side-wall portion, with a gap of 0.2 mm or more and 3 mm or less from an outer surface of the top portion, an outer surface of the side-wall portion, and an outer surface of the corner portion; and a coating step of forming a coating layer on a surface of the pre-coated part including the gap by an electrode-position coating process by electrodeposition coating while the pre-coated part is immersed into an electrode-position paint that is flexible paint to electrically conduct in a state where the pre-coated part is attached to the automotive body, and forming a coating film by thermosetting the coating layer by paint baking treatment subsequent to the electrodeposition coating process, the coating layer being made of one of: a polyurethane cationic electrodeposition paint; an epoxy cationic electrodeposition paint; a urethane cationic electrodeposition paint; an acrylic anionic electrodeposition paint; and a fluororesin electrodeposition paint.

* * * * *